United States Patent
Ichinose et al.

(10) Patent No.: US 8,285,452 B2
(45) Date of Patent: Oct. 9, 2012

(54) TURNING MOTION ASSISTANCE DEVICE FOR ELECTRIC VEHICLE

(75) Inventors: Masanori Ichinose, Tsukuba (JP); Tomohiko Yasuda, Kashiwa (JP); Takayuki Sato, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 352 days.

(21) Appl. No.: 12/702,966

(22) Filed: Feb. 9, 2010

(65) Prior Publication Data

US 2010/0204887 A1 Aug. 12, 2010

(30) Foreign Application Priority Data

Feb. 12, 2009 (JP) ................. 2009-030453

(51) Int. Cl.
*G06F 19/00* (2006.01)
(52) U.S. Cl. .................... 701/41; 180/443
(58) Field of Classification Search .............. 701/41, 701/42; 180/443
See application file for complete search history.

(56) References Cited

U.S. PATENT DOCUMENTS 4,821,191 A * 4/1989 Ikemoto et al. ............ 701/38

FOREIGN PATENT DOCUMENTS

| JP | 09-099826 | | 4/1997 |
|---|---|---|---|
| JP | 2005-145141 | | 6/2005 |
| JP | 2006-282066 | | 10/2006 |
| JP | 2006282066 A | * | 10/2006 |
| JP | 2007-210586 | | 8/2007 |
| JP | 2008-067436 | | 3/2008 |
| JP | 2008-094214 | | 4/2008 |
| JP | 2008094214 A | * | 4/2008 |
| JP | 2008-100579 | | 5/2008 |
| JP | 2008-109833 | | 5/2008 |
| WO | WO 2008/133150 | | 11/2008 |

\* cited by examiner

*Primary Examiner* — Gerald McClain
(74) *Attorney, Agent, or Firm* — Antonelli, Terry, Stout & Kraus, LLP.

(57) ABSTRACT

To reduce tire wear, a turning motion assistance device for an electric vehicle is provided which includes a target wheel slip angle calculating unit for calculating a target wheel slip angle from the steering angle, a vehicle state quantity detector for detecting vehicle state quantities, an actual vehicle-body slip angle calculating unit for calculating an actual vehicle-body slip angle from the vehicle state quantities, an actual wheel slip angle calculating unit for calculating an actual wheel slip angle from the actual vehicle-body slip angle and the steering angle, a yawing moment requirement calculating unit for calculating a yawing moment requirement from a difference between the target wheel slip angle and the actual wheel slip angle, and a torque correction data calculating unit for calculating an amount of torque correction for generating the yawing moment required.

6 Claims, 9 Drawing Sheets

TURNING MOTION ASSISTANCE DEVICE FOR ELECTRIC VEHICLE

BACKGROUND OF THE INVENTION

1. Field of the Invention

The present invention relates to a turning motion assistance device for an electric vehicle equipped with driving wheels each actuated by an independent motor.

2. Description of the Related Art

There are techniques available to improve the turning performance of a vehicle and stabilize its turning behavior. In such a technique, the appropriate yawing-moment target value is set according to a particular steering operation by a driver, and a driving and braking force to be imparted to left and right driving wheels is independently controlled so that a differential torque between both driving wheels is generated, thereby creating a desired yawing moment. Another technique intended to ensure turning response during the initial phase of steering and suppress uneven tire wear is described in JP-2006-282066-A, for example. In this latter technique, the camber angle of steered wheels is changed only during the initial phase of steering, thereby to generate a lateral force (camber thrust) and achieve the response, and in a steady state region, the camber angle is returned to an initial angle and the lateral force is generated using a wheel slip angle due to steering.

SUMMARY OF THE INVENTION

To steer a vehicle for turning, it is usually necessary to change the direction of the forward-traveling vehicle and generate a yawing motion. There has been the problem, however, that under the transient state of the turn, tires, in particular, easily become worn since a significant yawing moment is required and since driving wheels also increase in wheel slip angle.

The technique disclosed in above JP-2006-282066-A is used to directly set the desired yawing moment based upon the steering operations of the driver. In this conventional technique, however, the desired yawing moment does not change dynamically according to the particular behavior of the vehicle and is only determined statically with respect to a steering angle. Even if turning characteristics are expected to improve, therefore, it has been difficult, by using this conventional technique, to obtain a suppression effect against steering-wheel tire wear.

An object of the present invention is to provide a turning motion assistance device for an electric vehicle, adapted to effectively reduce tire wear of the vehicle while at the same time ensuring appropriate turning response.

In order to achieve the above object, an aspect of the present invention is a turning motion assistance device for an electric vehicle including one pair of driving wheels, one pair of motors each for driving or braking one of the paired driving wheels independently, and one pair of steered wheels, the assistance device comprising: steering input means for controlling a steering angle of each of the steered wheels on the basis of the amount of steering that is input by a driver; means for calculating, from the steering angle, a target wheel slip angle required for the vehicle to travel along a target turning path determined from the steering angle; means for detecting vehicle state quantities inclusive of an acceleration and speed of the vehicle; means for calculating an actual vehicle-body slip angle based upon the vehicle state quantities; means for calculating an actual wheel slip angle based upon the actual vehicle-body slip angle and upon the steering angle; means for calculating a yawing moment required for the vehicle to travel along the target turning path, from a difference between the target wheel slip angle and the actual wheel slip angle; and means for calculating an amount of torque correction that is to be assigned to each of the paired driving wheels independently to impart a differential torque thereto and generate the yawing moment required; wherein the paired motors assign to the respective driving wheels independently a torque that has been corrected using the calculated amount of torque correction.

According to the present invention, increases in the wheel slip angle of the steered wheels can be suppressed, which in turn enables tire wear of the vehicle to be reduced while at the same time ensuring appropriate turning response.

DESCRIPTION OF THE PREFERRED EMBODIMENTS

Hereunder, embodiments of the present invention will be described with reference to the accompanying drawings.

Figure 1:
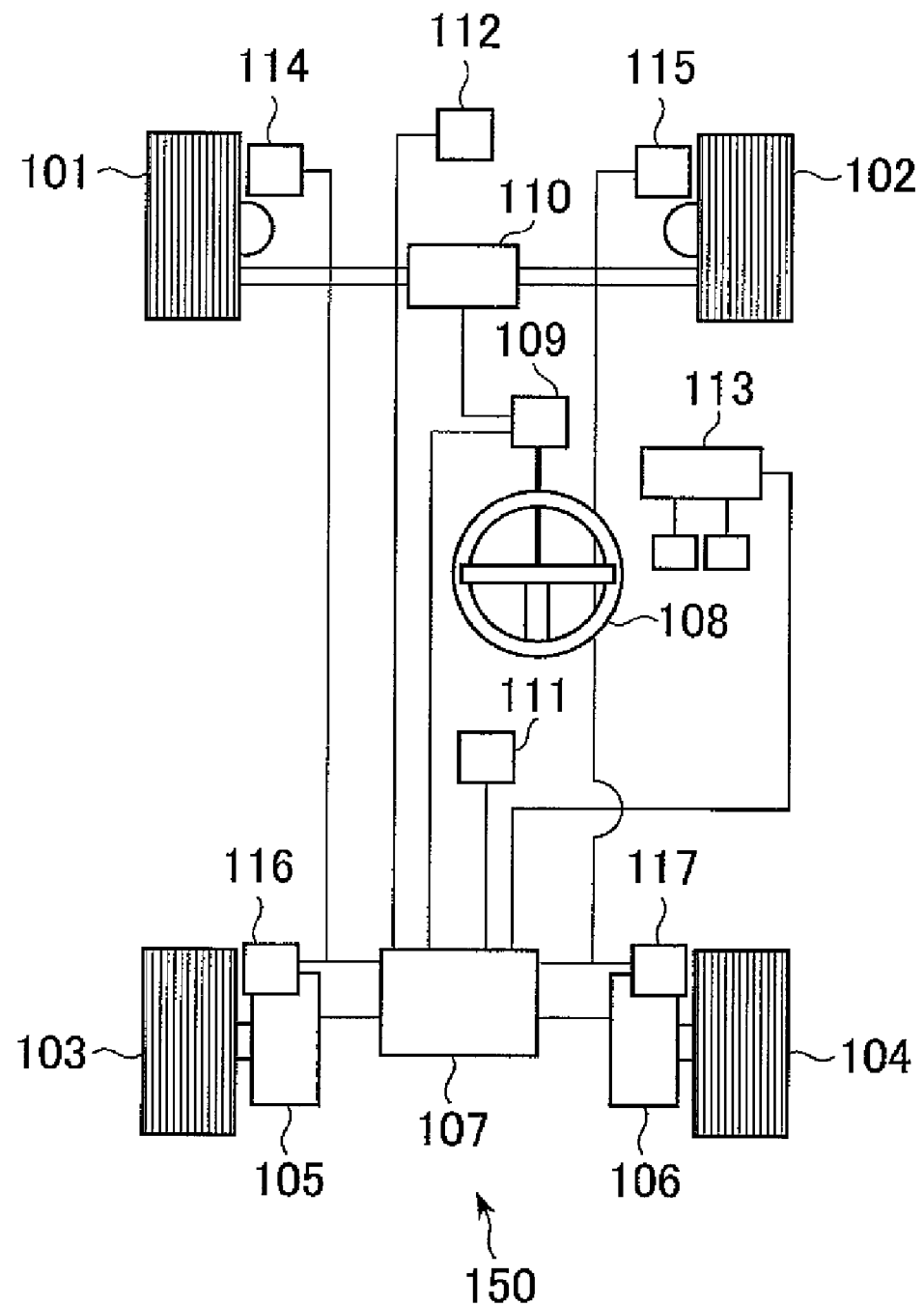
FIG. 1 is an overall block diagram of a turning motion assistance device for an electric vehicle that is a first embodiment of the present invention.

FIG. 1 is an overall block diagram of a turning motion assistance device for an electric vehicle that is a first embodiment of the present invention.

Major constituent elements of the electric vehicle shown in FIG. 1 include one pair of steered wheels 101 and 102, a steering wheel (steering input element) 108, a turning actuator 110, an operating pedal 113, one pair of driving wheels 103 and 104, one pair of motors 105 and 106, and the turning motion assistance device 150.

The paired steered wheels 101 and 102 have a degree of rotational freedom so as to be steerable for a turn, and are each fixed to a front section of the vehicle body. The steering wheel (steering input element) 108 to which the amount of steering is input by a driver is connected to the turning actuator (steering angle controller) 110 via a steering angle sensor (steering angle detector) 109.

The turning actuator (steering angle controller) 110 that conducts steering angle control of each of the steered wheels 101 and 102, based upon the amount of manipulation of the steering wheel 108, is connected to the steered wheels 101 and 102 via a tie rod. For example, the turning actuator 110 and steering wheel 108 of the vehicle in the present embodiment may be mechanically interconnected by a steering column so that the amount of manipulation of the steering wheel 108 is directly incorporated into the amount of control of the turning actuator 110, that is, the steering angle of the steered wheels 101 and 102.

The paired driving wheels 103 and 104 are connected to the paired motors 105 and 106 fixed to a rear section of the vehicle body, via a shaft. The motors 105 and 106 are each electrically connected to a controller 107 and independently drive or brake the driving wheels 103 and 104, respectively.

The turning motion assistance device 150, formed to assist a turning motion of the vehicle, includes the controller 107, a vehicle body motion sensor 111, an absolute velocity sensor 112, and wheel speed sensors 114, 115, 116, and 117, as major constituent elements.

The controller 107 conducts driving control of each of the motors 105 and 106, based upon information sent from various sensors connected to the controller 107. The operating pedal 113 and the steering angle sensor 109 are connected to the controller 107. An accelerating request and a decelerating request are transmitted from the driver through the operating pedal 113 to the controller 107, and a turning request is transmitted from the driver through the steering angle sensor 109 to the controller 107. In addition, the controller 107 is connected to various sensors. These sensors include, for example, the wheel speed sensors 114, 115, 116, and 117 that detect speeds of the steered wheels 101 and 102 and the driving wheels 103 and 104, the vehicle body motion sensor 111 that detects a yaw rate and magnitude of longitudinal/lateral acceleration, and the absolute velocity sensor 112 that directly measures a ground speed of the vehicle. The controller 107 acquires information on the vehicle from the sensors 111, 112, and 114 to 117.

For a speed-up or slowdown of the vehicle, the controller 107 calculates a torque required for achieving the acceleration that the driver desires (i.e., a torque requirement), the calculation being based upon the driver's accelerating request or decelerating request that has been input from the operating pedal 113. The controller 107 next supplies an appropriate driving current to the motors 105 and 106 according to the calculated torque requirement, thereby controlling a traveling motion of the vehicle.

Figure 2:
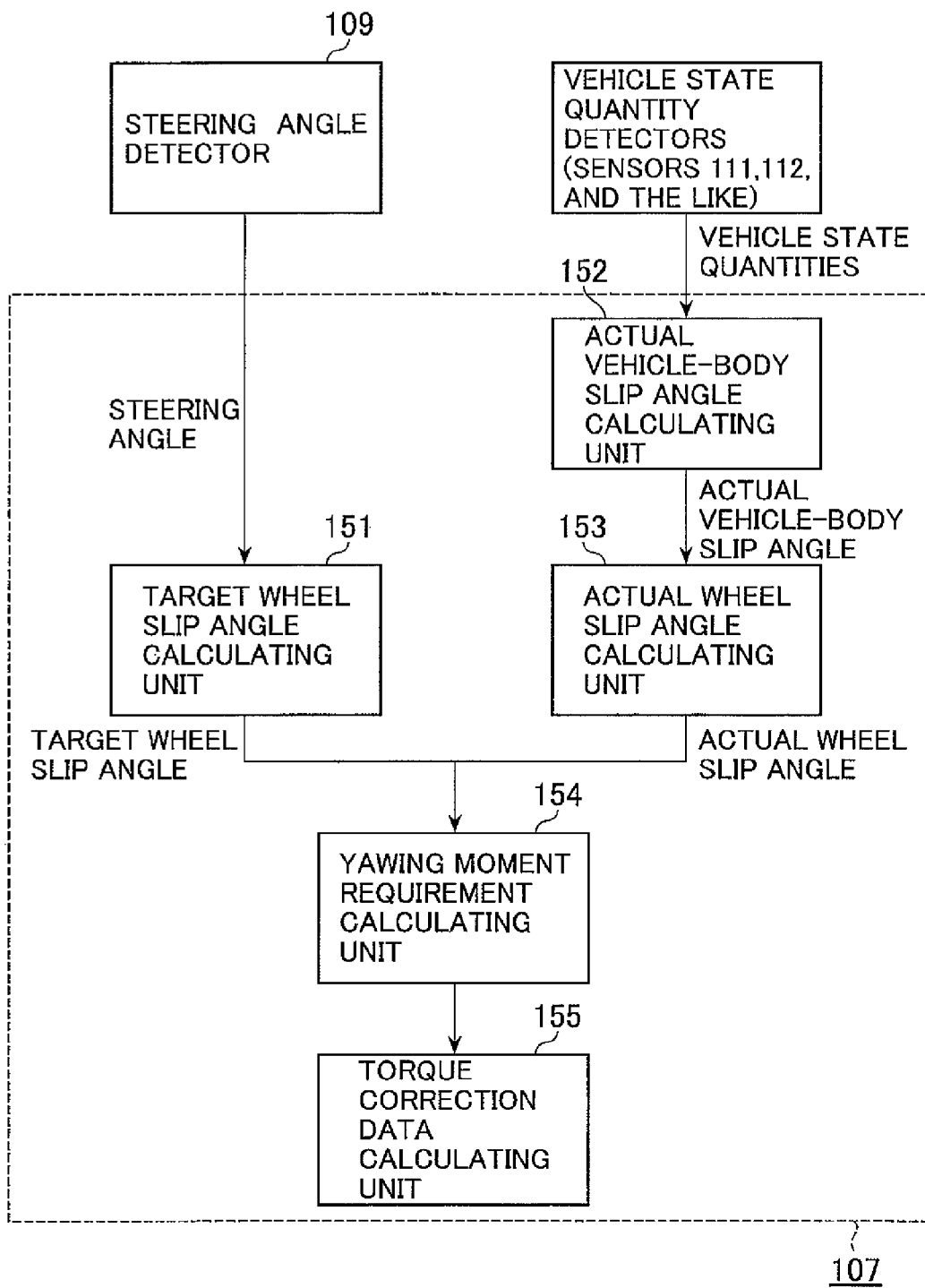
FIG. 2 is a block diagram of a controller in the first embodiment of the present invention.

FIG. 2 is a block diagram of the controller 107 in the first embodiment of the present invention.

In addition to the general control described above, the controller 107 in the present embodiment conducts torque control to make the driving wheels assist in creation of a yawing moment required for a start of a turn, the torque control being based upon appropriate correction of the driving current according to the driver's turning request. In order to implement the torque control, the controller 107 includes, as shown in FIG. 2, a target wheel slip angle calculating unit 151, an actual vehicle-body slip angle calculating unit 152, an actual wheel slip angle calculating unit 153, a yawing moment requirement calculating unit 154, and a torque correction data calculating unit 155. The torque control is described below with reference to FIG. 3.

Figure 3:
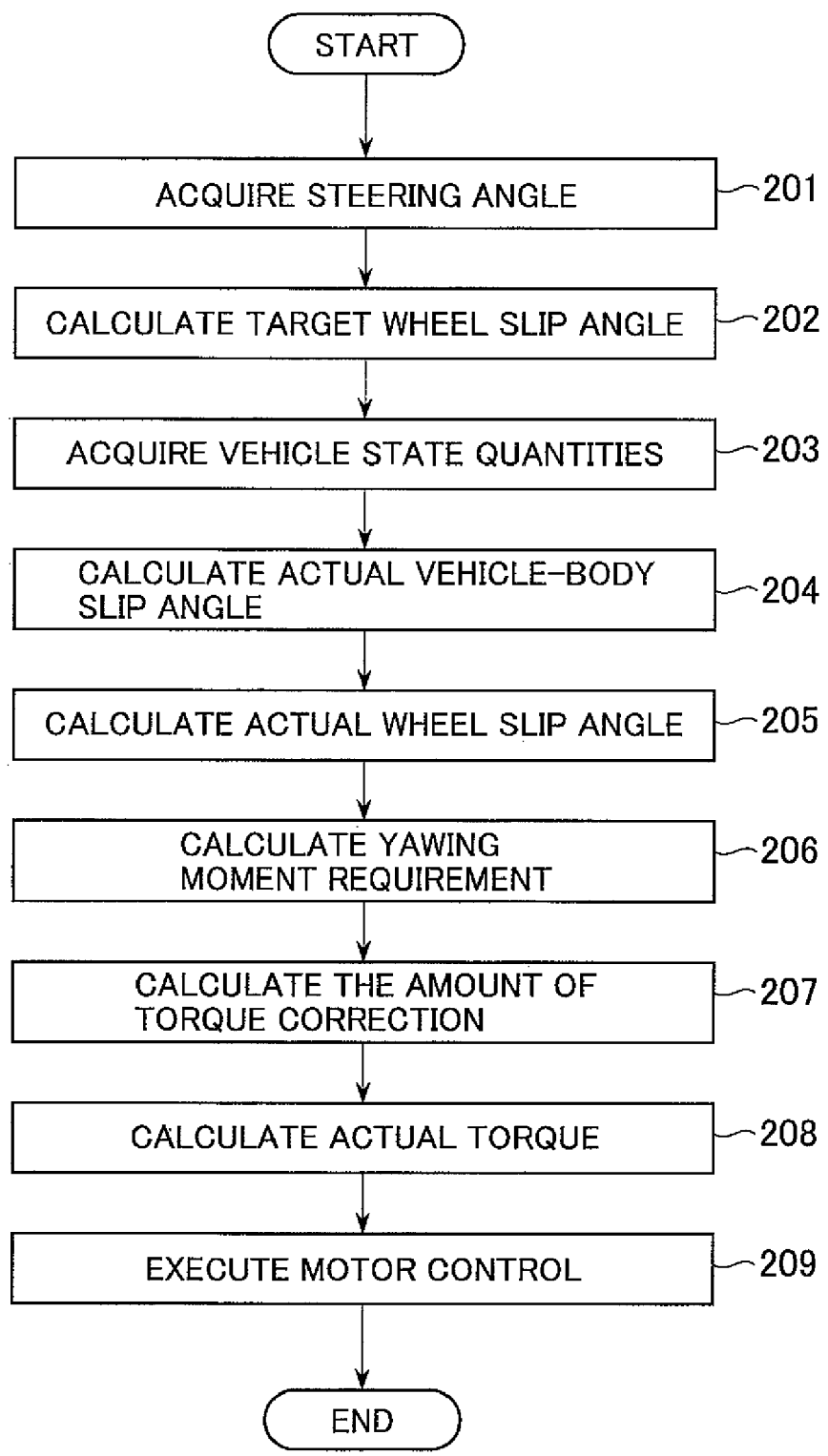
FIG. 3 is a flowchart of motor torque control by the controller in the first embodiment of the present invention.

FIG. 3 is a flowchart of the torque control of the motors 105 and 106 by the controller 107.

When the driver turns the traveling vehicle body, the controller 107 first acquires a steering angle of the steered wheels 101 and 102 which have been steered via the steering wheel 108 by the driver, and calculates a turning radius of the vehicle on the basis of the acquired steering angle (step 201). The controller 107 in the present embodiment acquires the steering angle of the steered wheels 101 and 102 by reading a value of the steering angle sensor (steering angle detector) 109. Since the steering angle is a magnitude of the driver's turning request, subsequent control occurs to obtain the turning radius calculated from the steering angle.

Next, the controller 107 activates the target wheel slip angle calculating unit 151 to calculate a turning path that becomes a control target (hereinafter, referred to as the target turning path), based upon a current vehicle speed and the steering angle that was acquired in step 201, and calculate a wheel slip angle (hereinafter, referred to as target wheel slip angle) that is required for the vehicle to travel along the target turning path (step 202).

This sequence is described in further detail below. The controller 107 first calculates the lateral acceleration (i.e., centrifugal force acting upon the vehicle) that is required for the vehicle to travel along the target turning path. The controller 107 next calculates, for each of the wheels 101 to 104, a lateral force needed to generate the calculated lateral acceleration. Based upon a magnitude of the calculated lateral force and upon ground surface contact states of each of the wheels 101 to 104 (e.g., a ground contact load and ground contact angle of the wheel), further calculations are conducted to obtain the target wheel slip angle of the wheel. The target vehicle-body slip angle can be used as the target wheel slip angle of the driving wheels 103 and 104 not subjected to steering. The reason for that is that since the driving wheels 103 and 104 are installed nearly in parallel to a lengthwise direction of the vehicle body, this means equivalency to controlling the target vehicle-body slip angle as a desired value.

Next, in step 203, the controller 107 acquires vehicle state quantities required for control of the motors 105 and 106, such as the acceleration and speed of the vehicle, via various sensors (vehicle state detectors) equipped in and/or on the vehicle. The vehicle body motion sensor 111, the absolute velocity sensor 112, the wheel speed sensors 114, 115, 116, and 117, and the like fall under a category of the vehicle state detectors in the present embodiment. The controller 107 acquires information on the longitudinal/lateral acceleration and the yaw rate, from the vehicle body motion sensor 111, and information on the vehicle speed and other vehicle state quantities, from the absolute velocity sensor 112 or the wheel speed sensors 114, 115, 116, and 117.

Next, in step 204, the controller 107 uses the actual vehicle-body slip angle calculating unit 152 to calculate the actual vehicle-body slip angle based upon the vehicle state quantities that were acquired in step 203.

At this time, since the actual vehicle-body slip angle is generally difficult to directly measure, the calculation thereof preferably uses one of several methods including, for example, (1) approximate calculation that uses the vehicle speed, the steering angle, the yaw rate, and/or the lateral acceleration, and (2) control by an observer using a vehicle motion model. In latter observer method (2), for example, a vehicle motion model for simulating dynamic turning motions of a vehicle is constructed in a control logic and after this, the vehicle state quantities acquired in step 204 are input to the model, whereby a traveling state of the model is then reproduced simultaneously with an actual traveling state. Next after a measurable vehicle state quantity such as the yaw rate has been compared with that of the model, an error between both state quantities is fed back into the model to match a behavior thereof to that of the actual vehicle. The vehicle-body slip angle that is the thus-obtained internal variable of the vehicle motion model is used as an estimated vehicle-body slip angle for control, and this concept underlies the observer method.

Next, in step 205, the controller 107 uses the actual wheel slip angle calculating unit 153 to calculate the actual wheel slip angles of each of the wheels 101 to 104, based upon relative positions of each of the wheels 101 to 104 (primarily, the steering angle of the steered wheels 101 and 102) and upon the actual vehicle-body slip angle calculated in step 204. More specifically, one of the simplest methods of calculating the actual wheel slip angle of the steered wheels 101 and 102 is by subtracting the calculated actual vehicle-body slip angle in step 204 from the steering angle. For the driving wheels 103 and 104 fixed to the vehicle body, a method in which the actual vehicle-body slip angle calculated in step 204 is regarded as the actual wheel slip angle, would be the simplest of all conceivable methods. Alternatively, after any changes in geometry due to displacement of a suspension have been retained in the form of a table or the like in the controller 107, these changes may be useable to improve calculation accuracy of the actual wheel slip angle.

Next, in step 206, the controller 107 uses the yawing moment requirement calculating unit 154 to compare the target wheel slip angles of each wheel, calculated in step 202, and the actual wheel slip angles of each wheel, calculated in step 205, and calculate the yawing moment requirement that is the yawing moment required for the vehicle to travel along the target turning path.

More specifically, the following methods are useable here to calculate the yawing moment requirement. Firstly on the assumption of a linear region, since the lateral force generated by a tire is a product of cornering power and a wheel slip angle, a shortage of the lateral force can, most simply, be regarded as a value obtained by multiplying a differential between the target wheel slip angle of each of the wheels 101 to 104 and the actual wheel slip angle, by the cornering power. The yawing moment requirement, therefore, can be calculated by multiplying the shortage of the lateral force by a distance from a center of gravity to the corresponding wheel and deriving a total for all wheels 101 to 104. In perspective of absorbing torque delays, detection errors, output errors, and the like, it is preferable that: a controller such as a PID controller should be mounted and a value obtained by multiplying the above-calculated yawing moment requirement by one control gain or another should be taken as the moment requirement that is a control value.

Next, in step 207, the controller 107 uses the torque correction data calculating unit 155 to calculate the amount of torque correction to be given as a torque correction value to each of the driving wheels 103 and 104 independently in order to impart a differential torque to the driving wheels 103 and 104 and generate the yawing moment requirement calculated in step 206. The force to be given to each of the driving wheels 103 and 104 can basically be calculated by dividing the value of the yawing moment requirement in step 206 by the distance from the center of gravity to the driving wheels 103 and 104. Therefore, the amount of torque correction for generating the yawing moment requirement can be calculated by multiplying the above-calculated force by a radius of the driving wheels 103 and 104.

In step 208, the controller 107 adds the torque correction value that was calculated in step 207, to a torque requirement calculated from the amount of stepping-on of the operating pedal 113 (i.e., the acceleration requested from the driver) and calculates a torque to be actually given as an actual torque to each of the driving wheels 103 and 104 independently. In step 209, the yawing moment required for the vehicle to travel along the target turning path can be created by giving the thus-calculated actual torque to each of the driving wheels 103 and 104 independently via the motors 105 and 106.

Figure 4:
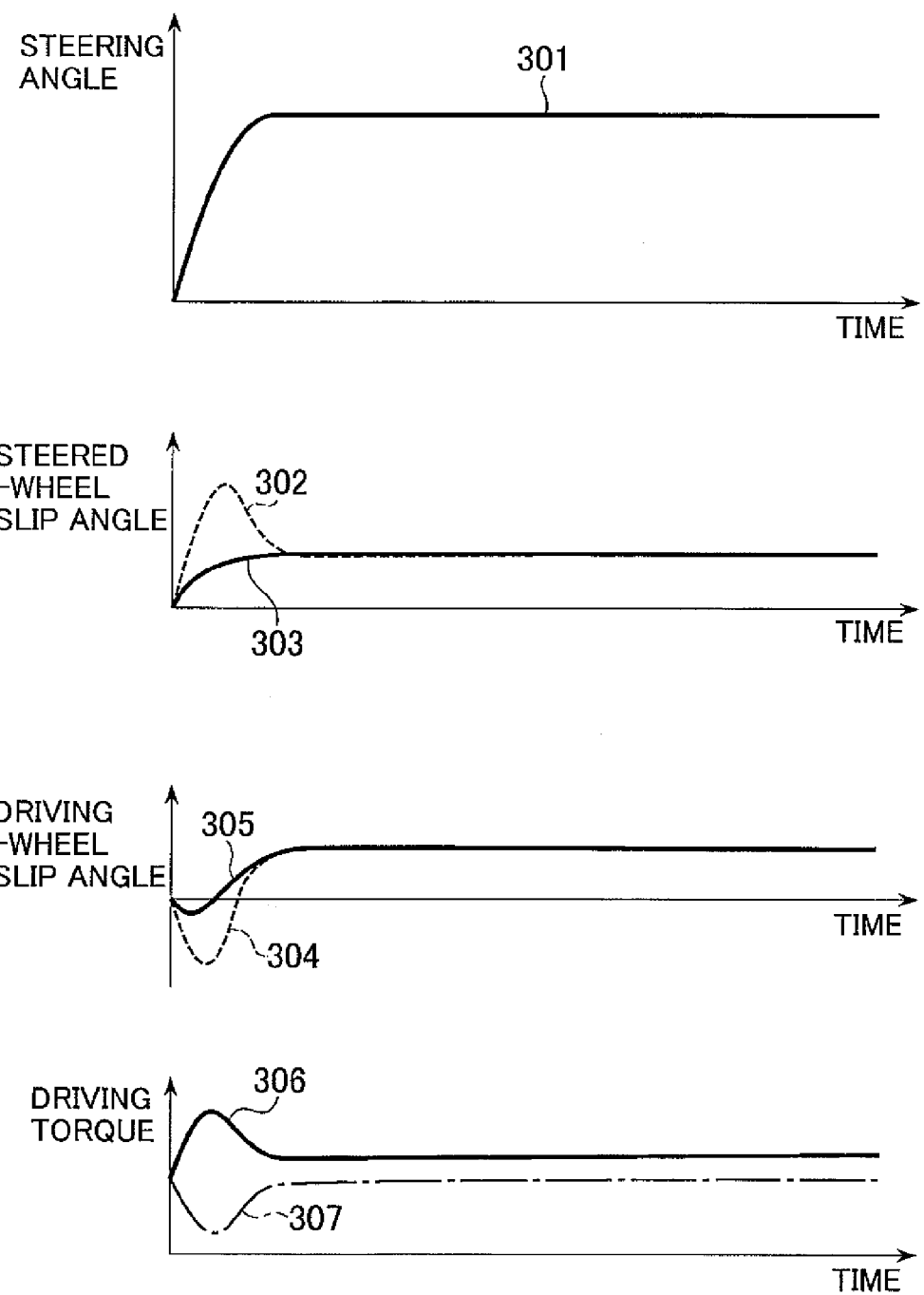
FIG. 4 shows an example of a vehicle body motion response by the turning motion assistance device for the electric vehicle that is the first embodiment of the present invention.

Next, operation of the above-constructed turning motion assistance device for the electric vehicle is described below with reference to FIG. 4. FIG. 4 shows an example of a vehicle body motion response by the turning motion assistance device for the electric vehicle that is the first embodiment of the present invention.

A solid line 301 in FIG. 4 indicates time-varying changes in the steering angle of the steered wheels 101 and 102. In addition, a broken line 302 indicates time-varying changes in the wheel slip angle of the steered wheels 101 and 102 that is obtained in a conventional example when the torque correction control described in FIG. 3 is not conducted. Furthermore, a solid line 303 indicates time-varying changes in the wheel slip angle of the steered wheels 101 and 102 that is obtained in an example of the present embodiment when the above control is conducted.

As indicated by the solid line 301, an increase in the steering angle in the conventional example abruptly raises the wheel slip angle 302 of the steered wheels 101 and 102 and causes the vehicle body to enter a transient state in which it starts a yawing motion. Next after the vehicle body has gone through the transient state, the wheel slip angle converges into one commensurate with the centrifugal force and the vehicle body changes to a steady turning state. In the present embodiment, however, the creation of a yawing moment in FIG. 3 by the driving wheels 103 and 104 precedes that of a yawing moment by the steered wheels 101 and 102. This allows the vehicle body to rapidly converge the wheel slip angle 303 of the steered wheels 101 and 102 without reaching the transient state, and thus to shift to the steady turning state. In this way, the present embodiment, compared with the conventional example, significantly suppresses any increases in the wheel slip angle of the turning vehicle, thus suppressing any increases in a dynamic frictional region of the tires, and reducing tire wear.

In addition, a broken line 304 in FIG. 4 indicates time-varying changes in the wheel slip angle of the driving wheels 103 and 104. (i.e., the vehicle body slip angle) that is obtained in the conventional example when the control is not conducted, whereas a solid line 305 indicates time-varying changes in the wheel slip angle of the driving wheel 103, 104 that is obtained in an example of the present embodiment when the control is conducted.

It can be seen that, as shown in FIG. 4, an increase in the steering angle causes the wheel slip angle 305 in the present embodiment to rapidly exit the transient state in which a change of a traveling route precedes a rotational motion of the vehicle body, and shift to the steady turning state. Additionally, there is an advantage in that when the vehicle body slip angle, or the wheel slip angle, rapidly stabilizes at a steady value in this way, the vehicle can easily avoid an overshoot (i.e., a spinning state) of the vehicle body slip angle that is prone to occur particularly on a slippery road surface.

Left and right driving torques of the driving wheels 103 and 104 during the control are further shown at a bottom position of FIG. 4. A solid line 306 indicates time-varying changes in the driving torque of the wheel positioned externally to the turning path, and a dotted line 307 indicates time-varying changes in the driving torque of the wheel positioned internally to the turning path. As shown in FIG. 4, in the example of the present embodiment, a significant left-right differential torque is generated during the transient state of the initial phase of the turn, thereby to create a yawing moment. If the vehicle exhibits understeer characteristics in comparison with the control target, the torque actually occurring can be obtained by calculating the amount of torque correction for assisting the turn not only in the transient state thereof but also in the steady state (i.e., the left-right differential torque in the steady state), and then adding the calculated value to the torque requirement.

In the electric vehicle of the present embodiment having the above-described configuration, the creation of the yawing moment required for the start of the turn can be assisted with the driving wheels 103 and 104 according to the particular amount of steering. That is to say, a longitudinal force by the driving wheels 103 and 104, in addition to the lateral force by the steering of the steered wheels 101 and 102, can be used to generate the yawing motion of the vehicle body during the turn (i.e., the rotational motion in a direction of the turn). This allows a lateral-force load of the steered wheels 101 and 102 to be reduced, hence allowing the wheel slip angle thereof to be reduced and tire wear to be lessened. Briefly, according to the present embodiment, since increases in the wheel slip angle can be suppressed, tire wear of the vehicle can be reduced while at the same time ensuring turning response. Furthermore, as described above, the present embodiment also makes reference to the wheel slip angle of the driving wheels 103 and 104 during control, so that the vehicle body slip angle is controlled with respect to the target value. This allows traveling characteristics to be stabilized since the vehicle can avoid an occurrence of "oversteer", a spinning state in which an excessive vehicle-body slip angle is formed, and an occurrence of "understeer", a state in which an excessive steered-wheel slip angle is formed.

In the above description, the target wheel slip angles and actual wheel slip angles of all wheels 101 to 104 (namely, the steered wheels 101 and 102 and the driving wheels 103 and 104) have been calculated in order to calculate the necessary yawing moment in step 206. However, the yawing moment required may be calculated by deriving the target wheel slip angle and actual wheel slip angle of either the steered wheel pairing 101, 102 or the driving wheel pairing 103, 104. This is because, compared with the corresponding value obtainable in the conventional example, the wheel slip angle of the steered wheels 101 and 102 can likewise be reduced by calculating the necessary yawing moment in that way. Control of the steered wheel pairing 101, 102, in particular, allows prevention of its slipping, and control of the driving wheel pairing 103, 104 allows the stabilization of the vehicle body.

Next, a second embodiment of the present invention is described below. The present embodiment further reduces the load of the steered wheels 101 and 102 in the first embodiment by increasing actively the yawing moment created by torque correction of the driving wheels 103 and 104. For example, further reduction of wear on the steered wheels can be achieved if the yawing moment required for the vehicle body to rotate on its axis during the steady turn is created by the torque correction.

The present embodiment assumes that the steering actuator 110 and the steering wheel 108 are mechanically separated from each other or that the latter includes, for example, a variable gear ratio mechanism positioned midway in or on a steering column. Constructing the vehicle in this way allows the steering angle of the steered wheels 101 and 102 to be set independently of the steering angle of the steering wheel 108. The reason for this construction is that unlike the first embodiment not requiring the mechanical connection between the steering actuator 110 and the steering wheel 108 because of the steered wheels 101 and 102 being excluded from the control of the steering angle by the controller 107, the second embodiment assumes that the steering angle of the steered wheels 101 and 102 is controlled.

Figure 5:
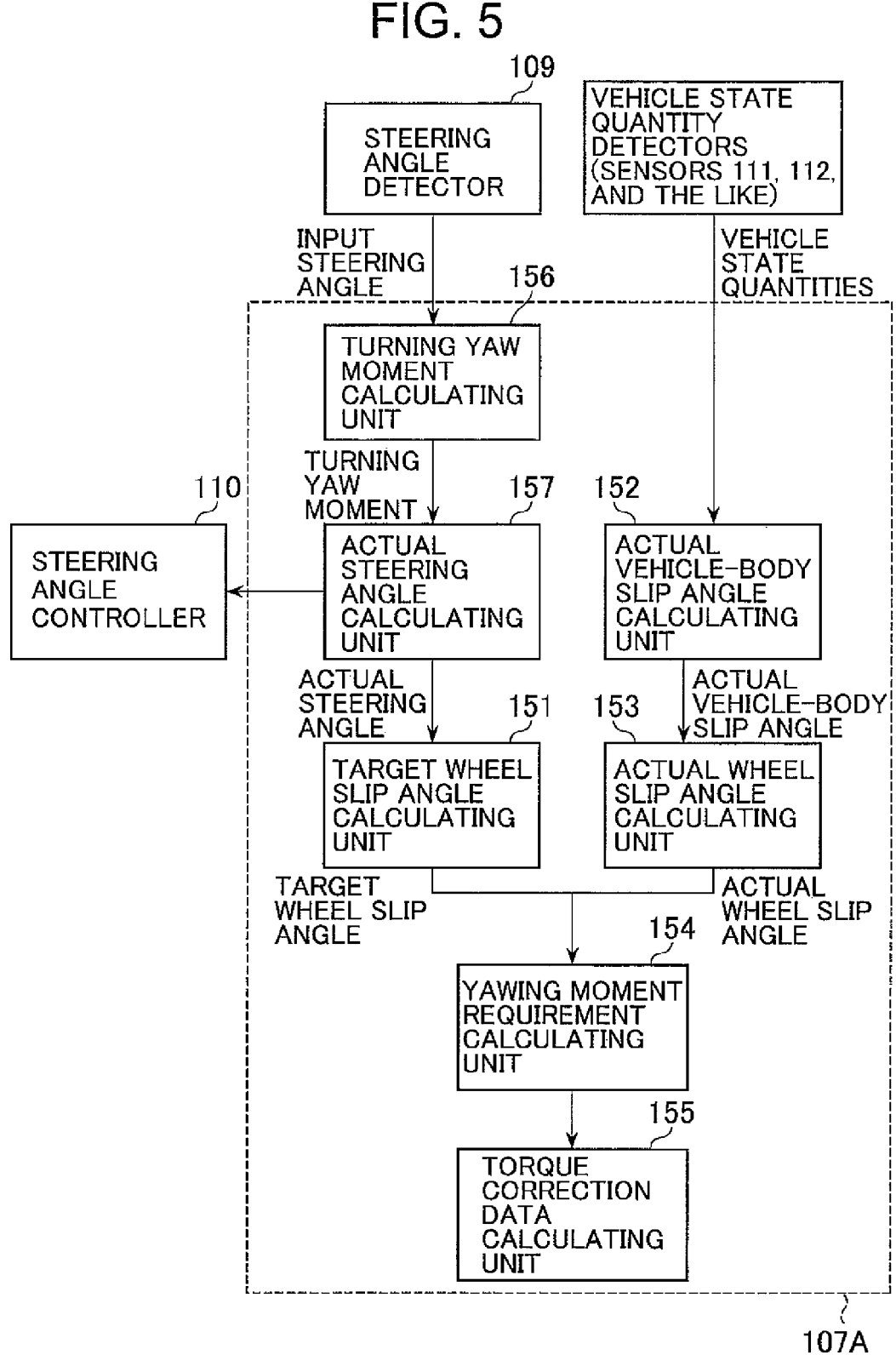
FIG. 5 is a block diagram of a controller in a second embodiment of the present invention.

FIG. 5 is a block diagram of a controller 107A in the second embodiment of the present invention.

The controller 107A shown in FIG. 5 includes a turning yaw moment calculating unit 156 and an actual steering angle calculating unit 157, in addition to the constituent elements used in the first embodiment.

Figure 6:
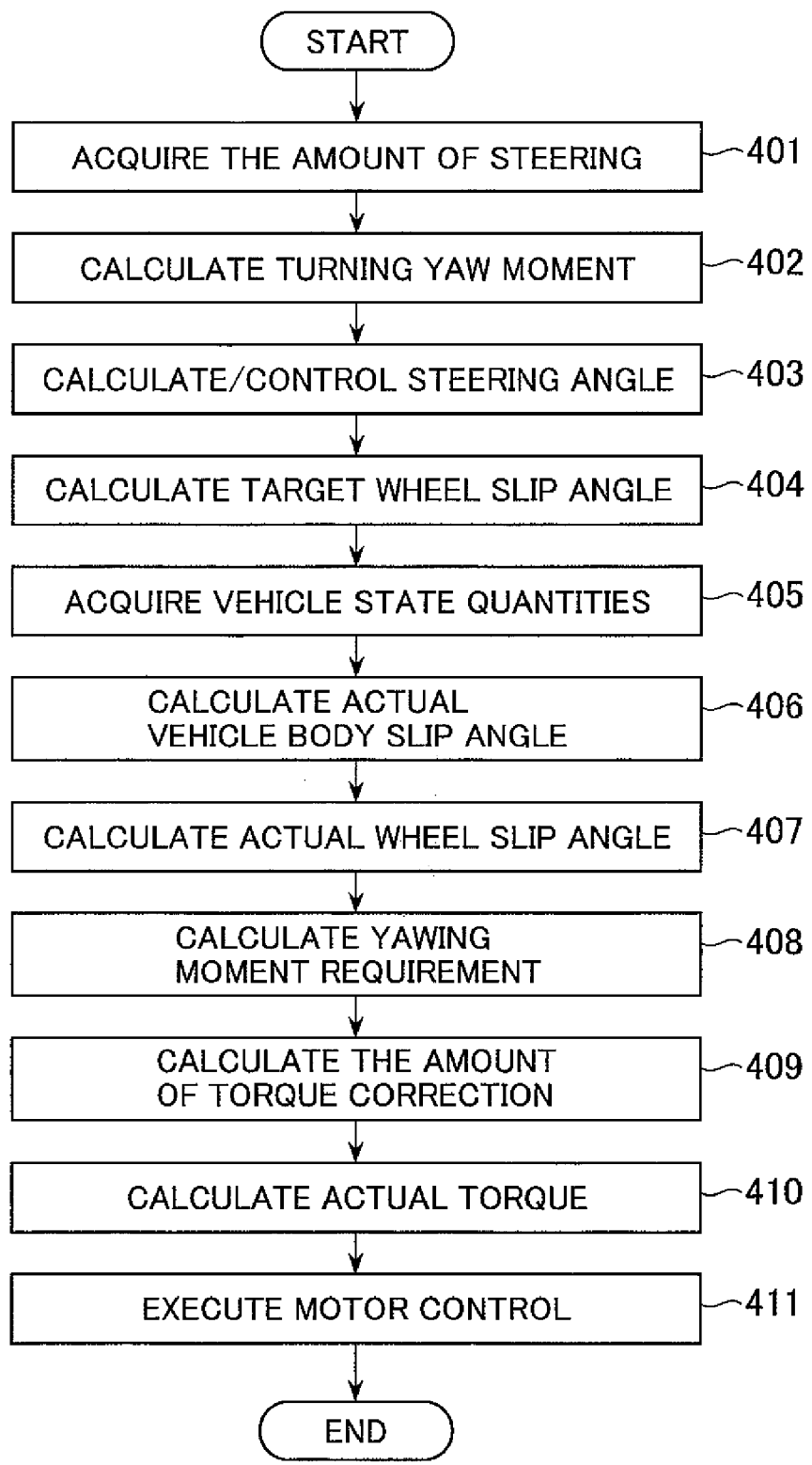
FIG. 6 is a flowchart of control of steered wheels and motors by the controller in the second embodiment of the present invention.

FIG. 6 is a flowchart of control of the steered wheels 101 and 102 and the motors 105 and 106 by the controller 107A.

When the driver turns the vehicle body by means of the steering wheel 108, the controller 107A first acquires via the steering angle sensor 109 the amount of steering (i.e., steering angle) of the steering wheel 108 that is input by the driver (step 401).

Next, the controller 107A activates the turning yaw moment calculating unit 156 to calculate the yawing moment with which the steered wheels 101 and 102 are to be burdened on the assumption that the vehicle body turns at the steering angle directly determined by the amount of steering (turning request) that was acquired in step 401 (the determined angle is hereinafter referred to as the input steering angle). In step 402, the controller 107A further calculates a burden rate of the calculated yawing moment to assist the turn with the yawing moment to be created by torque control of the driving wheels 103 and 104 (this yawing moment is hereinafter referred to as the turning yaw moment). In other words, in the present embodiment, part of the yawing moment with which the steered wheels 101 and 102 have been burdened in the first embodiment is assigned to the driving wheels 103 and 104 on the basis of a predetermined burden rate or the like, whereby the amount of yawing moment with which the driving wheels 103 and 104 are to be burdened is determined as the amount of creation of the turning yaw moment. For example, if all necessary yawing moment is created by torque control, the turn of the vehicle body will have only torque-steer characteristics without the steered wheels 101 and 102 being turned, and conversely if the rate of creation by torque control is lessened, the steering angle and the turning vehicle state will approach the "non-controlled" vehicle state.

Next, the controller 107A activates the actual steering angle calculating unit 157 to calculate a steering angle (steering angle correction value) appropriate for the turning yaw moment that was calculated in step 402, and then calculate an actual steering angle for actual control of the steered wheels 101 and 102 by subtracting the above-calculated steering angle from the input steering angle. On the basis of this actual steering angle, the turning actuator 110 controls the steered wheels 101 and 102 in step 403. The steering angle correction value here can be calculated, for example, by calculating a lateral force equivalent to the turning yaw moment calculated in step 402, and dividing this lateral force by the cornering power of the tire. The actual steering angle can be calculated after that by subtracting the calculated steering angle correction value from the input steering angle that is the steering angle obtained by multiplying the amount of steering in step 401 by a steering gain.

In steps from 404 to 408, the yawing moment required is basically calculated using essentially the same procedure from steps 202 to 206, set forth in the first embodiment. However, the present embodiment differs from the first embodiment in that in the target wheel slip angle calculating unit 151 (step 404) and the actual wheel slip angle calculating unit 153 (step 407), the actual steering angle that was calculated in step 403 is used as the steering angle of the steered wheels 101 and 102.

Next, the controller 107A activates the torque correction data calculating unit 155 to calculate in step 409 the amount of torque correction to be given to each of the driving wheels 103 and 104 independently in order to generate, by creating a differential torque therebetween, the amount of yawing moment that is equivalent to a sum of a yawing moment requirement calculated in step 408 and the turning yaw moment calculated in step 402.

In step 410, the controller 107A calculates an actual torque by adding a torque requirement to the amount of torque correction that was calculated in step 409, and in step 411, assigns the calculated an actual torque to the driving wheels 103 and 104 via the motors 105 and 106.

According to the present embodiment constructed to operate as described above, since the amount of yawing moment created by the steered wheels 101 and 102 can be reduced by the equivalent of the turning yaw moment which was used to assist the turn with the driving wheels 103 and 104, the steering angle of the steered wheels 101 and 102 can be reduced below that achieved in the first embodiment. Thus, the lateral-force load upon the steered wheels 101 and 102 is reduced and tire wear is correspondingly reduced.

In the present embodiment, since a yawing moment is created during the steady turn and at the same time, the steering angle is controlled according to the amount of yawing moment created, a turning response gain can always be maintained at a constant level, for purposes such as preventing oversteer of the steering wheel, with respect to the amount of steering that is input from the steering wheel (steering input element) 108. A feeling of discomfort during steering operations of the driver can therefore be reduced during the creation of the yawing moment in the steady turning state, as well as during the creation of the yawing moment in the transient state of the turn (i.e., during the start of the turn). A feeling of operation can be consequently improved.

Next, a third embodiment of the present invention is described below. The present embodiment relates to a twin-motorized vehicle configuration, wherein electric power generated by one motor will be supplied to the other motor. For example, to create a yawing moment under a non-acceleration or non-deceleration state or any other state of nearly zero driving torque, one motor (e.g., the motor 105) needs to drive one driving wheel (e.g., the driving wheel 103) in order to implement power-operation of the vehicle, whereas the other motor (e.g., the motor 106) needs to brake the other driving wheel (e.g., 104) in order to implement regenerative vehicle operation. In such a case, electric power that has been generated during regenerative operation can be used as that of power-operation by modifying a driving circuit composition.

Figure 7:
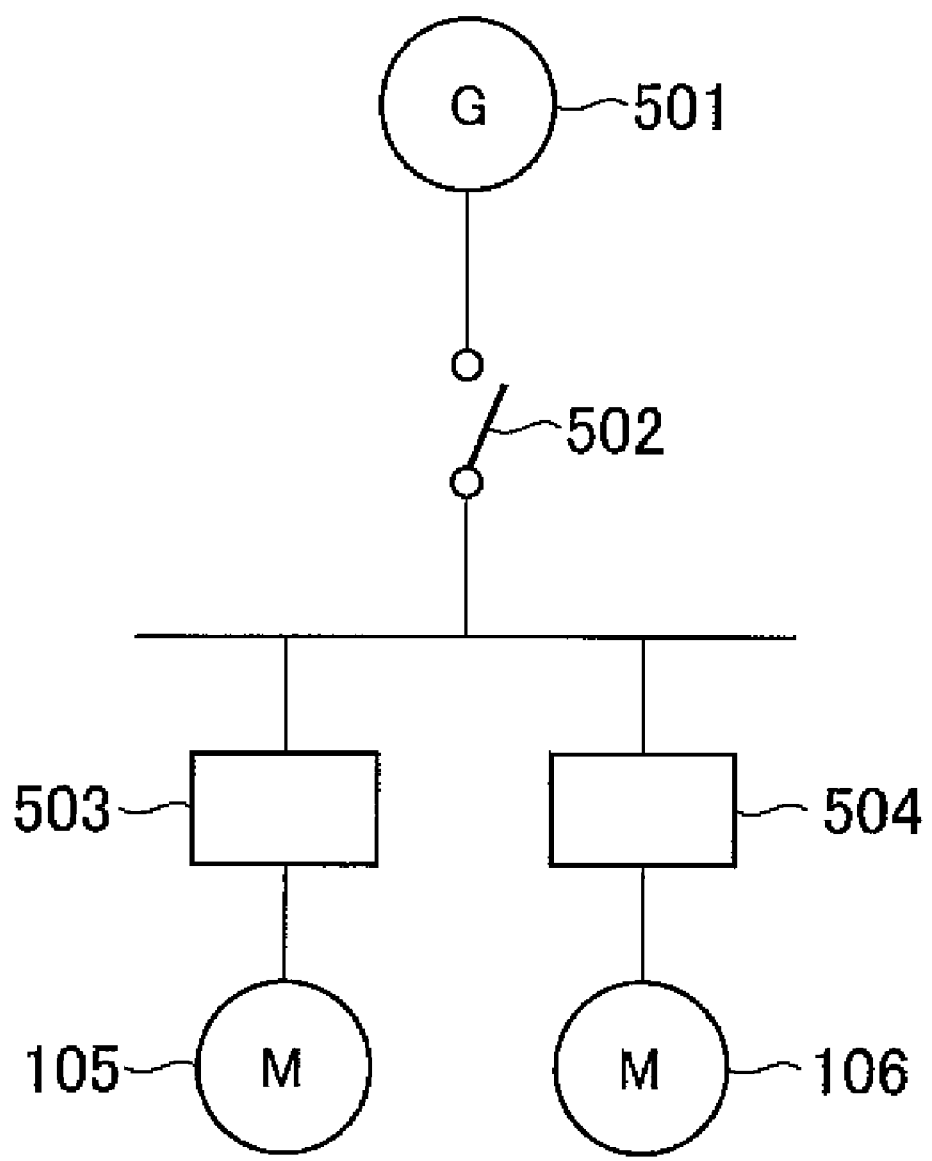
FIG. 7 is a diagram showing a driving circuit in a turning motion assistance device for an electric vehicle that is a third embodiment of the present invention.

FIG. 7 is a diagram showing a driving circuit in the turning motion assistance device of the electric vehicle that is the third embodiment of the present invention. Description of the elements each assigned the same reference number as in all previous diagrams is omitted, which also applies to all diagrams that succeed.

The circuit shown in FIG. 7 includes an electric power generator, a battery, or any other voltage source 501 existing under a normal driving state, an inverter 503 connected to the motor 105 in order to control an electric current supplied thereto, an inverter 504 connected to the motor 106 in order to control the electric current supplied thereto, and a switch 502 that undertakes connection/non-connection selection between the inverters 503, 504 and the voltage source 501.

This circuit is composed so that under normal traveling conditions, the switch 502 is closed for the inverters 503, 504 to control the supply current from the voltage source 501 and drive the motors 105 and 106, respectively. Under operating conditions that cause one of the paired motors 105 and 106 to apply a braking torque to the appropriate driving wheel and the other motor to apply a driving torque to the other appropriate driving wheel, the switch 502 is opened to electrically isolate the voltage source 501 from the circuit. Upon the isolation of the voltage source 501, the regenerative electric power that one motor has generated during regenerative braking is received in and consumed by the other motor for the power driving thereof, so the regenerative electric power can be reused, irrespective of a charging rate or of whether a battery exists. According to the present embodiment, therefore, the electric power consumed during the creation of a yawing moment can be reduced under the conditions that power-operation and regenerative braking occur at the same time.

While the switch 502 in the above circuit composition has been opened under the simultaneous occurrence of power-operation and regenerative braking, control that sets the supply voltage of the voltage source 501 to be lower than a voltage generated during regenerative braking may be conducted instead of opening the switch 502. Adopting such a circuit composition allows the regenerative electric power to be supplied to the other motor, thus yielding essentially the same advantageous effects as those described above.

Alternatively, the above circuit may employ a composition in which a converter for converting a power-generating output of the motors 105 and 106 into a level higher than the supply voltage of the voltage source 501 is mounted in parallel with respect to the inverters 503 and 504 so that a power-generating output of the regenerative braking motor during the simultaneous occurrence of power-operation and regenerative braking can be boosted with the converter. An occurrence of regenerative electric power in a battery-less vehicle makes it necessary to convert the regenerative electric power into heat by inserting a resistor or the like. Adding the converter to the circuit composition, however, allows the regenerative electric power to be effectively consumed through the other motor without converting the regenerative electric power into heat, even in a battery-less vehicle.

Next, a fourth embodiment of the present invention is described below. In the present embodiment, the amount of creation of the turning yaw moment with which the driving wheels 103 and 104 are to be burdened is determined on the basis of tire wear levels of the steered wheels 101 and 102 and the driving wheels 103 and 104.

Figure 8:
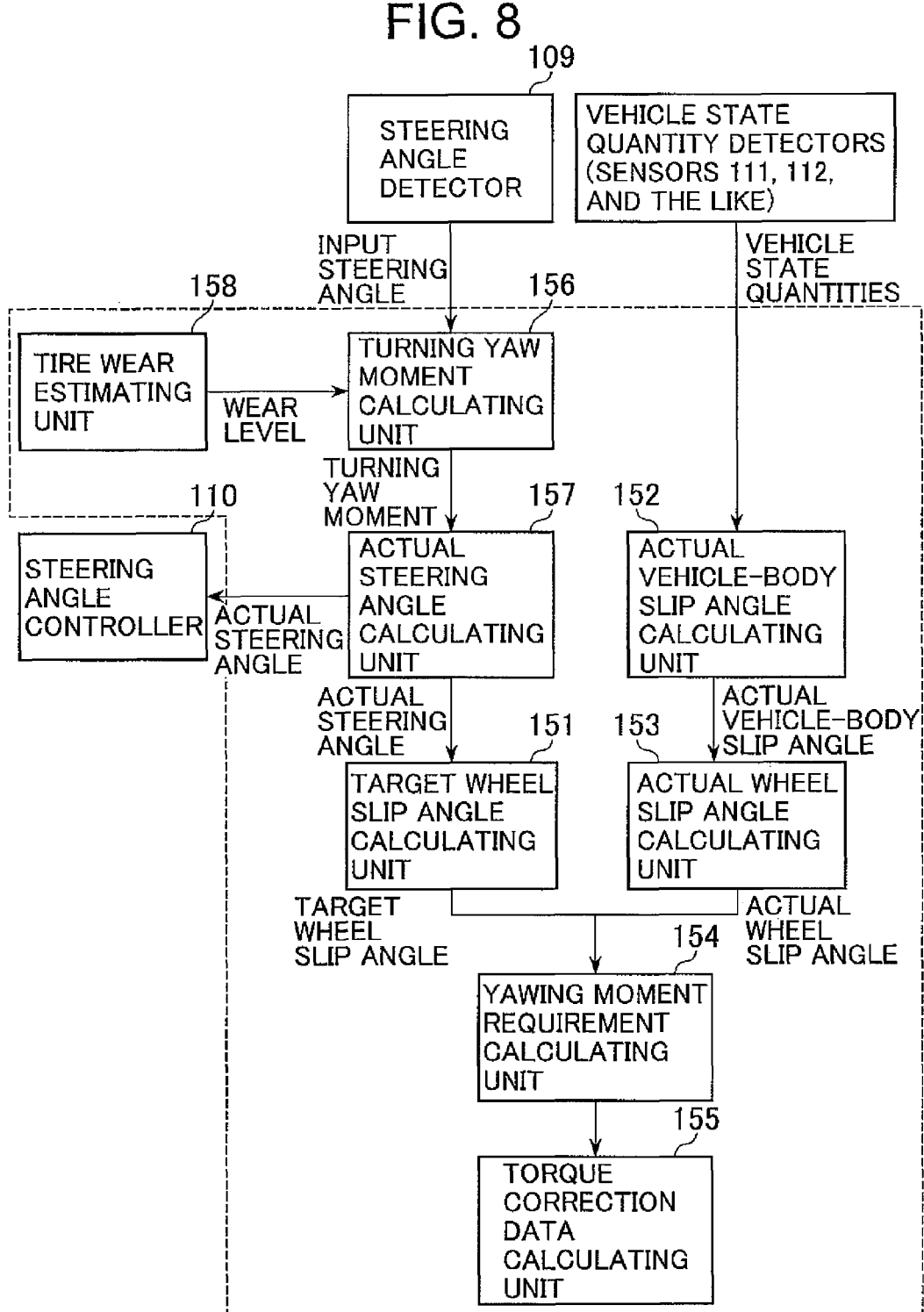
FIG. 8 is a block diagram of a controller in a fourth embodiment of the present invention.

FIG. 8 is a block diagram of a controller 107B in the fourth embodiment of the present invention. The controller 107B shown in FIG. 8 includes a tire wear estimating unit 158 in addition to each element described in the second embodiment.

The tire wear estimating unit 158 estimates the tire wear levels of the steered wheels 101 and 102 and driving wheels 103 and 104 from such cumulative data as of the braking force and driving force (braking/driving force) applied from the motors 105 and 106 to the driving wheels 103 and 104, and of the wheel slip angles of the steered wheels 101 and 102 and driving wheels 103 and 104.

A sticking region without signs of slipping against the ground surface, and a sliding region with such signs are formed on a tread of the tire. Tire wear is due mainly to the sliding region on the tire tread, for which reason, increases in size of the sliding region on the tire tread with increases in wheel slip angle or in the braking/driving force from the motors 105 and 106 also increase tire wear. An estimated value of the amount of tire wear, therefore, can be calculated by integrating the values obtained by multiplying the braking/driving force and the wheel slip angle by predetermined respective tire wear gains.

The turning yaw moment calculating unit 156 in the present embodiment, as in the second embodiment, first calculates the yawing moment with which the steered wheels 101 and 102 are to be burdened on the assumption that the vehicle body turns at the input steering angle. Of the calculated yawing moment components, only the amount of creation of the turning yaw moment that the driving wheels 103 and 104 are to share is next calculated. Prior to this calculation, in order that the tire wear levels of each of the wheels 101 to 104 equally approach, the amount of creation of the turning yaw moment is adjusted on the basis of the estimated tire wear level of the wheel 101 to 104 calculated in the tire wear estimating unit 158. After the calculation, essentially the same procedure as from step 403 onward in the second embodiment is executed on the basis of the thus-calculated turning yaw moment.

Adjusting the amount of creation of the turning yaw moment on the basis of the tire wear levels of the steered wheels 101 and 102 and the driving wheels 103 and 104 in this manner allows suppression of nonuniformity in the tire wear level of each of the wheels 101 to 104 and hence, reduction of maintenance costs associated with tire rotation and the like.

A fifth embodiment of the present invention will be next described.

Figure 9:
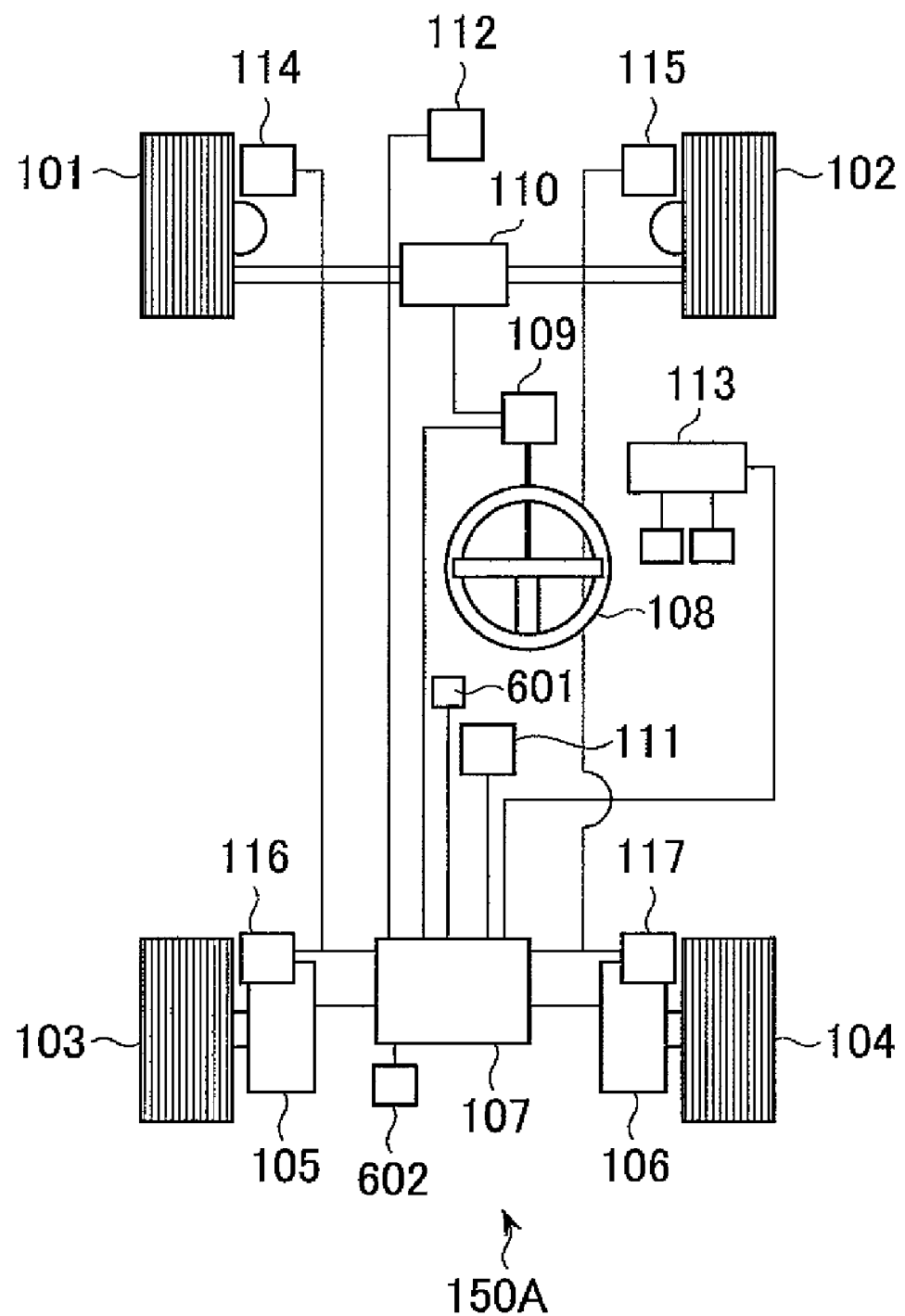
FIG. 9 is an overall block diagram of a turning motion assistance device for an electric vehicle that is a fifth embodiment of the present invention.

FIG. 9 is an overall block diagram of a turning motion assistance device for an electric vehicle that is the fifth embodiment of the present invention.

In addition to the constituent elements described in the first embodiment, the turning motion assistance device 150A for an electric vehicle, shown in FIG. 9, includes a position detector 601 that detects a traveling position of the vehicle, and a route information storage unit 602 into which traveling route information (e.g., a curvature, gradient, and road surface state of a road) on a traveling route of the vehicle is stored in associated form with position information. The position detector 601 and the route information storage unit 602 are connected to the controller 107. The controller 107 acquires a current traveling position via the position detector 601, calls up from the route information storage unit 602 the traveling route information existing at the current traveling position or at a position through which the vehicle is scheduled to travel after a predetermined time, and refers to the retrieved traveling route information timely in each of steps executed during torque control of the driving wheels 103 and 104.

Examples of position detection methods useable for the position detector 601 include: (1) absolute-coordinate measurement based upon GPS (Global Positioning System), (2) dead reckoning based upon wheel speed, steering angle, yaw rate measurement, and passage discrimination with markers, radio wave elements, phototubes, and/or other elements provided on the traveling route (e.g., course), and (3) a GPS—dead reckoning combination scheme for enhanced detection accuracy.

Examples of methods for storing route information into the route information storage unit 602 include entering map information beforehand. For repeated traveling on one specific route, there exists a method in which traveling route information is created by making the vehicle travel while storing the traveling path as position information into an internal memory.

According to the electric vehicle with the present embodiment constructed to operate as described above, the controller 107 can call up the traveling route information existing at current and future traveling positions in real time from the route information storage unit 602 during vehicle traveling. Thus, the controller 107 can pre-acquire traveling route information on a shape and other factors of the road at where the vehicle is placed. For example, if the amount of yawing moment required is calculated during reference to the thus-retrieved traveling route information, creation of the yawing moment can be assisted with the driving wheels 103 and 104, at an earlier phase, and the creation of a yawing moment that allows for the entire traveling route can be planned. In addition, of the traveling route information, only the road curvature of the traveling route may be used to determine a burden rate of the turning yaw moment created. That is to say, the burden rate may be determined according to the particular road curvature of the traveling route. Alternatively, after prior storage of road surface friction coefficients and other information into the route information storage unit 602, the position detector 601 and the route information storage unit 602 may use the stored information to adjust cornering power and other data that determines model characteristics.

In the above embodiments, no reference has been made to the type of vehicle to which the present invention is applied, but the invention is preferably applied to a transport vehicle designed to be loaded with heavy objects at rear (e.g., a vehicle with a carrying platform at rear, or a vehicle for container transport). Loading such a type of vehicle with heavy objects moves a center of gravity to rear wheels (driving wheels), reducing front wheels (steered wheels) in load. Since lateral force is proportional to both the load and a slip angle, the front wheels smaller in load need a greater slip angle to develop the same lateral force. In other words, in vehicles of this type, the steered wheels that are the front wheels tend to suffer wear due to a turn more easily. The application of the turning motion assistance device according to the present invention, however, allows lateral force to be generated using the driving wheels (rear wheels) that are greater in load, and thus the desired lateral force to be easily obtained while suppressing steered-wheel wear. Consequently, the vehicle develops particularly remarkable advantageous effects, compared with a general vehicle.

The above embodiments have each been described in regard to a vehicle whose steered wheels and driving wheels are separated from each other (i.e., primarily a vehicle driven by rear wheels). However, even in other vehicle structures with one pair of wheels acting in combination as both the pair of steered wheels and the pair of driving wheels (i.e., primarily a vehicle driven by front wheels), the invention can be applied similarly to the embodiments. In that case, wheel slip angles of the driving wheels can be substituted as those of the driven wheels (rear wheels). In this case, a turn will orient the driving wheels in a traveling direction of the vehicle. In perspective of creating a turning yaw moment, therefore, there is an advantageous effect in that the turning yaw moment can be created more efficiently than in the rear-wheel-driven vehicle structures relating to the embodiments.

While the best mode of carrying out the present invention has been described, a more specific configuration of the invention is not limited to the above embodiments, and any design changes falling within the scope of the invention are embraced in the invention.

What is claimed is:

1. A turning motion assistance device for an electric vehicle including one pair of driving wheels, one pair of motors each for driving or braking one of the paired driving wheels independently, and one pair of steered wheels, the assistance device comprising:

steering input means through which a particular amount of steering is input by a driver;

turning yaw moment calculating means for calculating a yawing moment with which each of the steered wheels is to be burdened on the assumption that the vehicle body turns at an input steering angle determined from the input amount of steering, and then calculating an amount of a turning yaw moment to be generated by imparting a differential torque to the paired driving wheels in order to assist in creation of a part of the calculated yawing moment;

means for calculating an actual steering angle by calculation of a steering angle appropriate for the turning yaw moment, followed by subtraction of the calculated steering angle from the input steering angle;

means for controlling each of the steered wheels to the actual steering angle;

means for calculating, from the actual steering angle, a target wheel slip angle required for the vehicle to travel along a target turning path determined from the input steering angle;

means for detecting state quantities of the vehicle, inclusive of an acceleration and speed thereof;

means for calculating an actual vehicle-body slip angle based upon the vehicle state quantities;

means for calculating an actual wheel slip angle based upon the actual vehicle-body slip angle and the actual steering angle;

means for calculating a yawing moment required for the vehicle to travel along the target turning path, from a difference between the target wheel slip angle and the actual wheel slip angle;

means for calculating an amount of torque correction that is to be assigned to each of the paired driving wheels independently to generate a yawing moment equivalent to a sum of the yawing moment requirement and the turning yaw moment by imparting a differential torque to the paired driving wheels;

means for estimating tire wear levels of the steered wheels and the driving wheels from a wheel slip angle of the steered wheels and the driving wheels, as well as from a braking and driving force acting upon the steered wheels and the driving wheels; and wherein the paired motors assign to the respective driving wheels independently a torque that has been corrected in accordance with the calculated amount of torque correction;

wherein, in order that the tire wear levels of the steered wheels and driving wheels, estimated by the tire wear estimating means, equally approach, the turning yaw moment calculating means calculates the amount of the turning yaw moment in order to assist in creation of a part of the yawing moment calculated from the input steering angle.

2. The turning motion assistance device for the electric vehicle according to claim 1,
   wherein: the target wheel slip angle and the actual wheel slip angle are both calculated for either the steered wheels or the driving wheels.

3. The turning motion assistance device for the electric vehicle according to claim 1,
   wherein: the paired motors are connected to each other such that either of the motors can receive an electric current generated by the other; and
   regenerative electric power generated when either of the motors imparts a braking torque to the associated driving wheel will be consumed as electric power used for the other motor to impart a driving torque to the associated driving wheel.

4. The turning motion assistance device for the electric vehicle according to claim 1, further comprising:
   position detection means for detecting a traveling position of the vehicle; and
   route information storage means into which traveling route information inclusive of a curvature, gradient, and road surface state of a road on a traveling route of the vehicle, is stored in associated form with position information;
   wherein the traveling route information at the traveling position detected by the position detection means is called up from the route information storage means and torque control of the driving wheels is conducted with reference to the retrieved traveling route information.

5. The turning motion assistance device for the electric vehicle according to claim 1,
   wherein: one pair of wheels is used in combination as both the pair of driving wheels and the pair of steered wheels.

6. The turning motion assistance device for the electric vehicle according to claim 1,
   wherein: the target wheel slip angle and the actual wheel slip angle are both calculated for all of the steered wheels and the driving wheels.

\* \* \* \* \*